United States Patent
Ido et al.

(10) Patent No.: US 6,948,464 B2
(45) Date of Patent: Sep. 27, 2005

(54) PROTECTION METHOD FOR AN ENGINE HAVING A VARIABLE VALVE TIMING CONTROLLER AND PROTECTION APPARATUS FOR THE SAME

(75) Inventors: Shinsuke Ido, Kariya (JP); Akira Tsunoda, Toyohashi (JP); Toshihiro Matsuura, Hamamatsu (JP); Yoshiyuki Takabe, Hamamatsu (JP)

(73) Assignees: Denso Corporation (JP); Asmo Co., Ltd. (JP)

( * ) Notice: Subject to any disclaimer, the term of this patent is extended or adjusted under 35 U.S.C. 154(b) by 0 days.

(21) Appl. No.: 10/793,678

(22) Filed: Mar. 5, 2004

(65) Prior Publication Data

US 2004/0184205 A1 Sep. 23, 2004

(30) Foreign Application Priority Data

Mar. 6, 2003 (JP) .................................. 2003-059727

(51) Int. Cl.[7] ................................................ F01L 1/34
(52) U.S. Cl. ................................ 123/90.15; 123/90.17; 123/90.31
(58) Field of Search .......................... 123/90.15, 90.17, 123/90.31

(56) References Cited

U.S. PATENT DOCUMENTS 5,265,572 A * 11/1993 Kadomukai et al. ........ 123/396
5,680,837 A * 10/1997 Pierik ...................... 123/90.17
6,129,061 A * 10/2000 Okuda et al. ............. 123/90.17

FOREIGN PATENT DOCUMENTS

JP          A-11-153008          6/1999

* cited by examiner

Primary Examiner—Thomas Denion
Assistant Examiner—Zelalem Eshete
(74) Attorney, Agent, or Firm—Nixon & Vanderhye PC

(57) ABSTRACT

The variable valve timing controller has an electric motor which rotates a phase converter. When the electric motor is locked for some reason, the over-load more than the predetermined value is applied to a motor shaft and the phase converter. In such a case, a pin connecting the motor shaft with the phase converter is sheared at a notch. Thus, a cam shaft and the phase converter were not locked, and breakage of a motor housing is prevented.

7 Claims, 2 Drawing Sheets

PROTECTION METHOD FOR AN ENGINE HAVING A VARIABLE VALVE TIMING CONTROLLER AND PROTECTION APPARATUS FOR THE SAME

CROSS REFERENCE TO RELATED APPLICATION

This application is based on Japanese Patent Application No. 2003-59727 filed on Mar. 06, 2003, the disclosure of which is incorporated herein by reference.

FIELD OF THE INVENTION

The present invention relates to a protection method and a protection apparatus for an engine having a variable valve timing controller. The variable valve-timing controller is referred to as a VVT controller hereinafter.

BACKGROUND OF THE INVENTION

JP-A-11-153008 shows a VVT controller which is driven by an electric motor. In this VVT controller, a sun gear of a planetary gearing is rotated by the electric motor, thereby a phase between a ring gear and a carrier is varied. The planetary gearing functions as a phase converter. The ring gear is driven by a driving shaft of an engine and the carrier is connected with a cam shaft. The ring gear is referred to an input member and the carrier is referred to an output member in this invention.

In this kind of the VVT controller equipped with the electric motor, the motor shaft and the cam shaft rotate together with keeping a mechanical connection. When the motor shaft is locked for some reasons, the cam shaft is also locked. In this situation, an over-load applied to the phase converter and the cam shaft may cause damages of the phase converter, the engine, and a motor housing. When the motor housing is broken, an engine oil may flow out.

SUMMARY OF THE INVENTION

An object of the present invention is to protect the engine from the damages described above and to prevent the engine oil from flowing out. In accordance with the object of the invention, when the motor is locked, the motor shaft is disconnected with the phase converter.

BRIEF DESCRIPTION OF THE DRAWINGS

Other objects, features and advantages of the present invention will become more apparent from the following detailed description made with reference to the accompanying drawings, in which like parts are designated by like reference numbers and in which.

DETAILED DESCRIPTION OF EMBODIMENT

Figure 1:
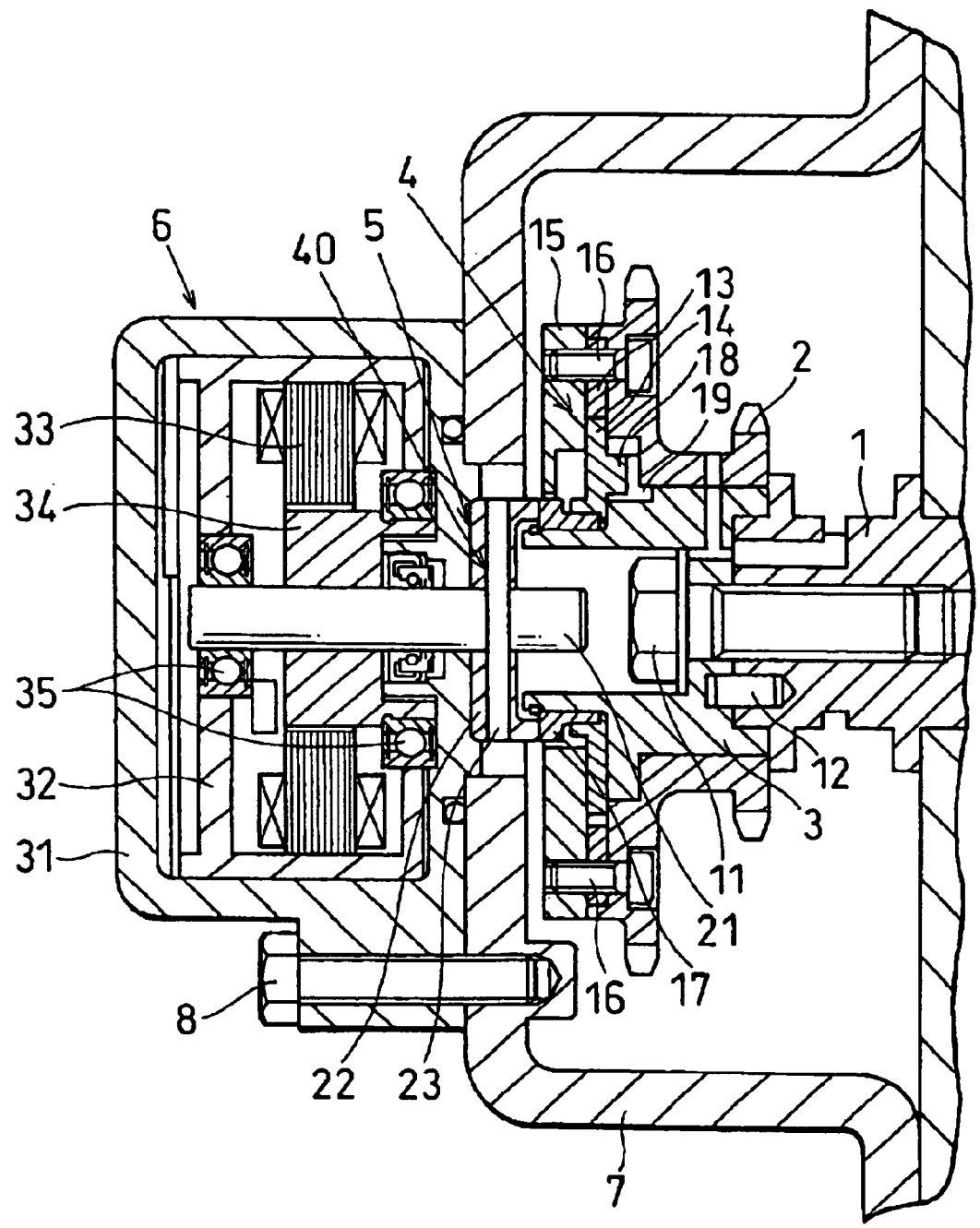
FIG. 1 is a longitudinal cross sectional view of a VVT controller according to a first embodiment of the present invention.
Figure 2:
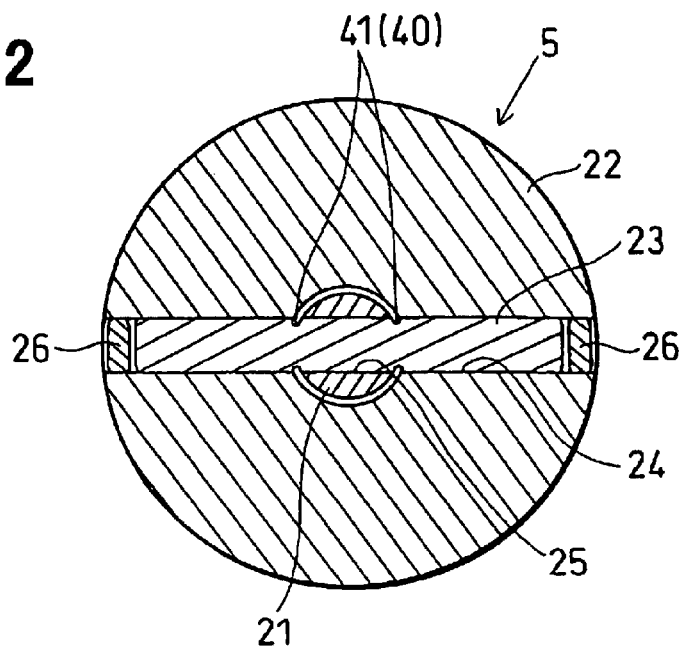
FIG. 2 is a cross sectional view of a coupling according to the first embodiment of the present invention.
Figure 3:
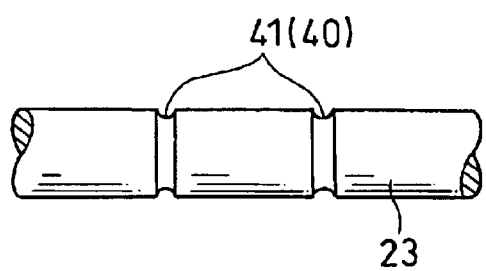
FIG. 3 is an enlarged view of a pin having notches according to the first embodiment of the present invention.

Referring to FIG. 1 through FIG. 3, the first embodiment of the present invention is described hereinafter.

FIG. 1 shows the VVT controller of the embodiment. The VVT controller is connected with a cam shaft 1 of an engine (internal combustion engine:not shown) so that an opening-closing timing of an intake valve or an exhaust valve is varied continuously during engine operation. The left side in FIG. 1 is referred to the front side and the right side in FIG. 1 is referred to the rear side for convenience in explaining the embodiment.

The VVT controller is comprised of a sprocket 2 which is correspond to an input member of the invention, a cam connecting member 3 which is correspond to an output member of the invention, a phase converter 4 for the sprocket 2 and the cam connecting member 3, a coupling 5, an electric motor 6 and the like. As shown in FIG. 1, the sprocket 2, the cam connecting member 3, the phase converter 4 and the coupling 5 are assembled integrally and disposed in a chain cover 7. The electric motor 6 is fixed on the chain cover 7 by a bolt 8.

The sprocket 2 is driven by an crankshaft through a chain and is rotatively supported by the cam connecting member 3. The sprocket 2 rotates with the cam shaft 1 around a same axis.

The cam connecting member 3 is fixed on the front side of the cam shaft 1 by a bolt 11 in order to rotate together, and a pin 12 prohibits the relative rotation between the cam connecting member 3 and the cam shaft 1.

The phase converter 4 is connected with the sprocket 2 and has a ring gear (an outer gear having gear tooth along an inner periphery) 13 and a sun gear (an inner gear having gear tooth along an outer periphery) 14. The sun gear 14 engages the ring gear 13 and has an eccentric axis to the cam shaft 1.

The ring gear 13 is disposed in a hollow portion formed at the front side of the sprocket 2 and fixed between the ring plate 15 and sprocket 2 by a screw 16.

An eccentric sleeve 17 is connected with a center portion of the sun gear 14 in such a manner that the sun gear 14 rotates eccentrically with engaging with the ring gear 13. The inner surface of the eccentric sleeve 17 is rotatively supported by the outer surface of the cam connecting member 3.

A plurality of the cylindrical bosses 18 are circularly formed at the rear surface of the sun gear 14. The bosses 18 protrude rearward and are engaged with concave portions 19 which are formed on the front surface of the cam connecting member 3. The inner diameter of the concave portions 19 is larger than the outer diameter of the bosses 18. A rotational force of the sun gear 14 is transmitted to the cam connecting member 3 through the bosses 18 with absorbing the eccentric gap.

The coupling 5 is comprised of a union 22 and a pin 23, and the coupling 5 connects the motor shaft 21 and the eccentric sleeve 17 so that the rotational torque of the motor shaft 21 is transmitted to the eccentric sleeve 17.

Referring to FIG. 2, a structure of the coupling 5 is explained. The union 22 is connected with the eccentric sleeve 17 in such a manner that the union 22 rotates with the eccentric sleeve 17. A through hole 24 extends along a line which is orthogonal to the rotational axis in the union 22.

The pin 23 is inserted into the through hole 24 and a motor shaft through hole 25 which extends along the line being orthogonal to the motor shaft 21. The rotational torque of the motor shaft 21 is transmitted to the eccentric sleeve 17 through the pin 23 and the union 22.

The union 22 and the eccentric sleeve 17 are of sliding to each other. If there is a gap between the axis of the motor shaft 21 and the axis of the union 22, a sliding of the union 22 and the eccentric sleeve 17 absorbs the gap.

Covers 26 are disposed at both ends of the through hole 24 for preventing the broken pieces of the pin 23 from falling down to a chain when the pin 23 is sheared due to the over-load.

An electric motor 6 is of conventional design and is controlled by an control unit (not shown). The electric motor 6 of this embodiment have a motor housing 31 fixed on a chain cover 7 by a bolt 8, a yoke 32 supported by a motor housing 31, a stator 33 fixed in the yoke 32 and a rotor 34 rotated by an excitation. The rotor 34 is connected with the motor shaft 21 through a bearing 35 and a rotational force of the rotor 34 is derived from the motor shaft 21.

When rotational speed of the electric motor 6 is accelerated, a rotation of the cam shaft 1 is advanced more than the rotation of the sprocket 2. That is, the rotational speed of the sun gear 14 is faster than that of the sprocket 2, and the cam shaft 1 rotates to the advance direction.

On the other hand, when the rotational speed of the electric motor 6 is decelerated, the rotational speed of the sun gear 14 is slower than that of the sprocket 2, and the cam shaft 1 rotates to the delayed direction.

As described above, the motor shaft 21 of the electric motor 6 is rotated with the cam shaft 1 via the coupling 5, the sun gear 14 of the phase converter 4 and the cam connecting member 3. When the motor shaft 21 is locked, the motor shaft 21 is mechanically disconnected with the phase converter 4 to protect the engine.

The VVT controller of the first embodiment has a safety mechanism 40 which breaks the connection between the motor shaft 21 and the phase converter 4 when a over-load is applied to the motor shaft 21 and/or the phase converter 4.

As shown in FIGS. 2 and 3, the safety mechanism 40 is comprised of a notch 41 formed on the surface of the pin 23. The shearing force is applied to the notch 41. In this embodiment, two notches 41 are formed. The shape of the notch 41 is not limited to the shape shown in FIG. 3, other shape is acceptable. The pin 23 is sheared at the notches 41 when the a certain amount of rotational load is applied. The certain amount of rotational load is determined not to damage the engine and is determined according to type of a vehicle or an engine.

While the engine is operated, the motor 6 is energized and the cam shaft 1 and the motor shaft 21 rotate together. When the rotor 34 and the motor shaft 21 are locked for some reason, the motor shaft 21 is driven by the rotational torque transmitted from the sprocket 2 and a rotational load lager than the predetermined value is applied. The pin 23 is sheared at the notches 41 and the motor shaft 21 and the phase converter are disconnected with each other. That is, the safety mechanism 40 is operated.

Thus, even if the electric motor 6 is locked, the cam shaft 1 and the phase converter 4 are not locked. The phase converter 4 and the engine therefore avoid the breakage. The engine torque from the sprocket 2 is not transmitted to the electric motor 6, and the motor housing 31 avoid the breakage thereof. The oil leakage from the motor housing 31 is prevented.

A second embodiment of the present invention is described hereinafter.

Figure 4:
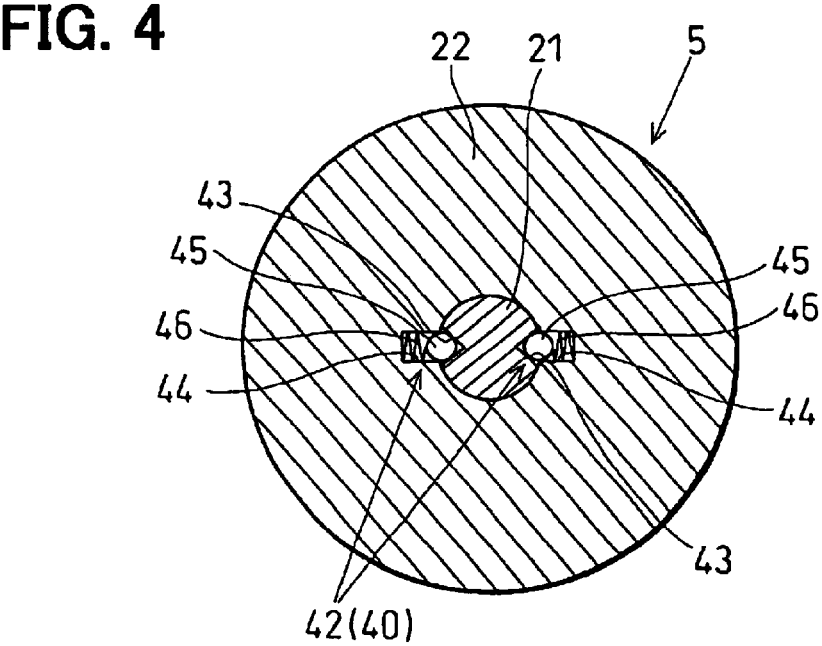
FIG. 4 is a cross sectional view of a coupling according to a second embodiment of the present invention.

FIG. 4 shows the coupling 5 and the safety mechanism 40 of the second embodiment.

The safety mechanism 40 is disposed between the motor shaft 21 and the union 22 and is comprised of a clutch mechanism 42 which disconnect the motor shaft 21 from the union 22.

As shown in FIG. 4, the clutch mechanism 42 is comprised of a V-shaped outer hole 43 on the surface of the motor shaft 21, an inner hole 44 at inner peripheral of the union 22 with confronting to the outer hole 43, a ball 45 engaging with the outer hole 43 and inner hole 44 and a spring 46 biasing the ball 43 toward the outer hole 43.

A diameter of the ball 43 is larger than the depth of the outer hole 43. The half of the ball 43 extends off the outer hole 43 and engages the inner hole 44. The diameter of the inner hole 44 is large enough to accept the half of the ball 43 biased by the spring 46.

When some trouble is happened in the electric motor 6 and the motor shaft 21 is locked under the operation of the engine, the motor shaft 21 is driven by the rotational torque through sprocket 2 and an over-load is applied to the phase converter 4 and the motor shaft 21. The ball 45 is thereafter disengaged with the outer hole 43 so that the safety mechanism 40 is operated.

Thus, even if the electric motor 6 is locked, the cam shaft 1 and the phase converter 4 are not locked. The phase converter 4 and the engine therefore avoid the breakage. The engine torque from the sprocket 2 is not transmitted to the electric motor 6, and the motor housing 31 avoid the breakage thereof. The oil leakage from the motor housing 31 is prevented.

In the embodiments described above, the safety mechanism 40 is disposed between the motor shaft 21 and the coupling 5. The safety mechanism 40 can be disposed in the coupling 5 or between the coupling 5 and the phase converter 4.

The axis of the motor shaft 21 can be offset to the axis of the cam shaft 1.

Even in the VVT controller wherein the motor shaft 21 does not rotate with the cam shaft 1, the safety mechanism 40 can be disposed.

The safety mechanism 40 can be displaced to an electric safety device. In the electric safety device, a sensor such as a rotation sensor detects the rotational speed of the electric motor 6. When the sensor detects the trouble of the electric motor 6, the motor shaft 21 and the phase converter 4 are disconnected each other by an actuator (not shown) actuated according to a signal from the sensor.

What is claimed is:

1. A protection device for an engine having a variable valve timing controller, comprising:

an input member driven by a drive shaft of the engine;

an output member connected with a cam shaft for opening and closing the valve;

an electrical motor generating a rotational force;

a phase converter driven by the electrical motor for converting the phase of the input member and output member; and a safety device for disconnecting a motor shaft of the electrical motor from the phase converter when a rotational load is applied to the motor shaft and the phase converter, the rotational load being above a predetermined value, wherein the safety device comprises an outer receptacle on the surface of the motor shaft, an inner receptacle at an inner periphery of a union mounted to the motor shaft, said inner receptacle confronting the outer receptacle, a ball engaging with the outer receptacle and the inner receptacle, and a spring biasing the ball towards the outer receptacle, and wherein when the rotational load of more than said predetermined value is applied to the motor shaft and the phase converter, the ball is disengaged from the outer receptacle so that the safety device disconnects the motor shaft from the phase converter.

2. A protection device for an engine having a variable valve timing controller, comprising:

an input member driven by a drive shaft of the engine;

an output member connected with a cam shaft for opening and closing the value;

an electrical motor generating a rotational force;

a phase converter driven by the electrical motor for converting the phase of the input member and output member; and a safety device for disconnecting a motor shaft of the electrical motor from the phase converter when a rotational load is applied to the motor shaft and the phase converter, the rotational load being above a predetermined value, wherein the motor shaft is connected with the phase converter by a pin, the pin penetrating both of the motor shaft and a connecting portion of the phase converter; and the safety device is a notch formed on the pin, the pin being sheared at the notch to disconnect the motor shaft from the phase converter.

3. The protection device for an engine having a variable valve timing controller according to claim 1, wherein the phase converter is comprised of a sun gear and a planet gear.

4. The protection device for an engine having a variable valve timing controller according to claim 1, wherein the safety device is a notch circularly formed on the outer surface of the cylindrical pin.

5. The protection device for an engine having a variable valve timing controller according to claim 1, wherein a diameter of the ball is larger than a depth of the outer receptacle.

6. The protection device for an engine having a variable valve timing controller according to claim 1, wherein said inner receptacle comprises an inner hole for receiving said spring and at least a portion of said ball.

7. The protection device for an engine having a variable valve timing controller according to claim 1, wherein said outer receptacle has a depth of no more than one half said diameter of said ball.

* * * * *